I. BROOME.
TIRE.
APPLICATION FILED JULY 29, 1912.

1,066,791.

Patented July 8, 1913.

Witnesses

Inventor
Isaac Broome.

UNITED STATES PATENT OFFICE.

ISAAC BROOME, OF TRENTON, NEW JERSEY.

TIRE.

1,066,791.  Specification of Letters Patent.  Patented July 8, 1913.

Application filed July 29, 1912. Serial No. 712,029.

*To all whom it may concern:*

Be it known that I, ISAAC BROOME, a citizen of the United States, residing at Trenton, in the county of Mercer and State of New Jersey, have invented certain new and useful Improvements in Tires, of which the following is a specification.

The present invention relates to a resilient tire for use in connection with automobiles or other vehicles, and has particular reference to a tire formed of a plurality of sections or blocks of elastic material, which are completely covered by a metallic armor.

An important object of this invention is to provide a tire of the above mentioned character which will possess a desired degree of elasticity and last a very long time.

A further object of this invention is to provide a metallic armor to cover the blocks of rubber or other elastic material, which armor is formed in a plurality of sections to be suitably flexible and is provided with novel means to prevent the same from slipping with relation to the blocks of rubber.

Other objects and advantages of the invention will be apparent during the course of the following description.

Figure 1:
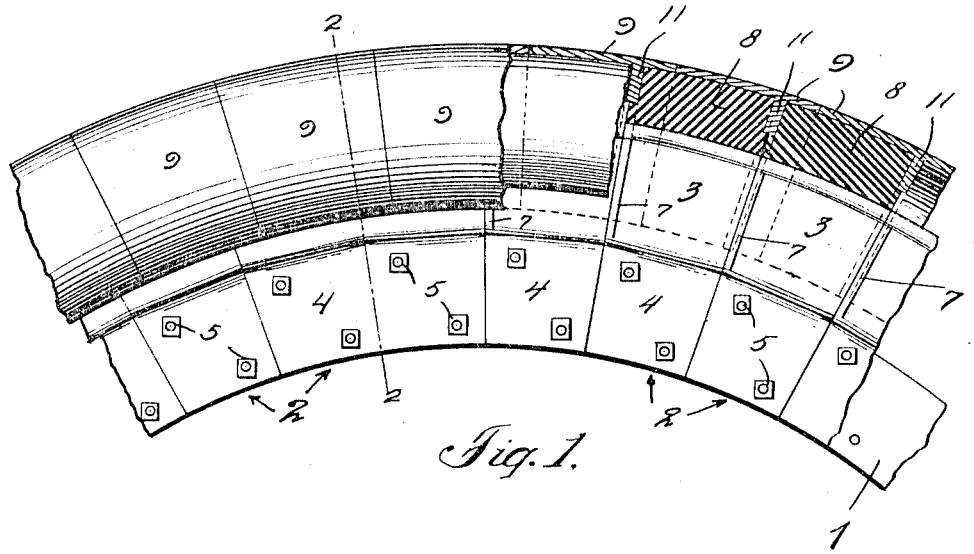
Figures 2, 3, 4:
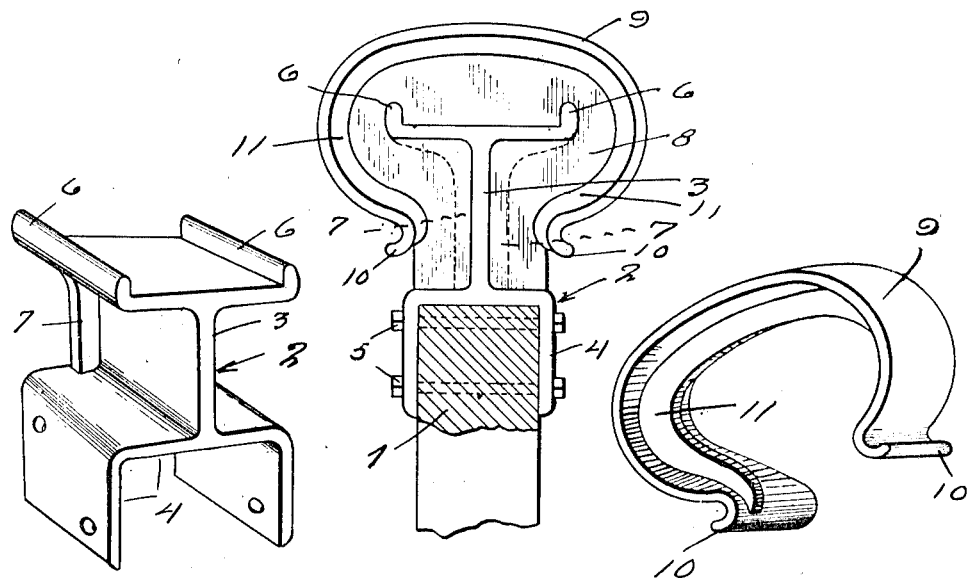

In the accompanying drawings forming a part of this specification and in which like numerals are employed to designate like parts throughout the same, Figure 1 is a fragmentary side view of a wheel equipped with my improved resilient tire, Fig. 2 is a cross-sectional view taken on line 2—2 of Fig. 1, Fig. 3 is a perspective view of one of the metal holding members employed to secure the block of rubber to the felly, and, Fig. 4 is a similar view of a plate or section comprised in the armor.

In the drawings wherein is illustrated a preferred embodiment of my invention, the numeral 1 designates the felly of a wheel of any well known or preferred type.

My improved tire comprises a plurality of holding members 2 which are formed of iron or other suitable metal. Each of these holding members is radially disposed with relation to the felly and comprises a T-shaped outer portion 3 that is rigidly attached to and preferably formed integral with an inner U-shaped portion 4. This U-shaped inner portion is adapted to straddle the felly 1 and is rigidly connected therewith by means of bolts 5 or the like. T e head of the outer T-shaped portion 3 is provided at its ends with outwardly extending flanges 6.

The numeral 7 designates flanges or ribs which are formed upon the body portion of the T-shaped portion 3 at one end thereof, as shown.

The resilient tire comprises a plurality of compressible and expansible sections or blocks 8, which are preferably formed of solid rubber having a desired degree of elasticity. Each of these blocks of rubber has a substantially T-shaped opening formed therethrough for receiving the T-shaped portion 3 of the holding member 2. The block 8 is also provided with suitable openings for receiving the outwardly extending flanges 6. Surrounding the blocks 8 is a suitably flexible metallic armor, which is formed of a plurality of curved plates or sections 9. Each of these plates or sections is preferably curved, as shown in Fig. 4, with the free ends thereof bent outwardly, as shown at 10. Rigidly connected with each armor plate 9 and preferably formed integral therewith is an inwardly extending rib or flange 11, disposed near and spaced from one end of the plate. This rib serves to reinforce and stiffen the plate 9 and also engages between two of the blocks 8 to prevent the plate from creeping or slipping in relation to the block 8.

In assembling the parts of the tire, the holding member 2 has its T-shaped outer portion 3 inserted within the opening formed through the block or section 8. The ribs or flanges 7 engage one end of the block to prevent said block from moving in that direction with relation to the holding member. The holding member 2 is then placed upon the felly so that the U-shaped portion 4 thereof will straddle the felly, subsequently to which it is attached to the felly by means of the bolts 5. The armor plate 9 is next placed on the block 8 thus assembled and the flange or rib 11 will engage one end of said block, whereby the armor plate is prevented from moving in one direction with relation to said block. The next holding member 2 carrying its block is placed on the felly and the flange or rib 11 will occupy a position between the adjacent ends of the blocks 8, as shown.

It is to be understood that the form of my invention herewith shown and described is to be taken as a preferred example of the same and that certain changes in the shape, size, and arrangement of parts may be resorted to without departing from the spirit of the invention or the scope of the subjoined claim.

Having thus described my invention, I claim:—

The combination with the felly of a wheel, of a plurality of elastic blocks arranged about the felly, each elastic block having an enlarged head which is approximately cylindrical and a reduced inner shank, means to securely attach the blocks to the felly, and a metallic armor surrounding the blocks and including a plurality of metallic plates which are approximately cylindrical to correspond to the curvature of said blocks and having their free ends engaging the reduced shanks to prevent their lateral spreading, each metallic plate being provided upon its inner surface with a relatively shallow rib extending substantially the entire length of the metallic plate and adapted to be inserted for a short distance only between two adjacent elastic blocks, whereby the metallic plate is prevented from creeping with relation to the blocks, said metallic plate is suitably reinforced and stiffened, and the entire structure possesses a desired degree of resiliency.

In testimony whereof I affix my signature in presence of two witnesses.

ISAAC BROOME.

Witnesses:
WM. L. VANDEWATER,
M. F. McDADE.